United States Patent
Shoji

(10) Patent No.: US 9,915,324 B2
(45) Date of Patent: Mar. 13, 2018

(54) WORK VEHICLE

(71) Applicant: KUBOTA CORPORATION, Osaka (JP)

(72) Inventor: Yusuke Shoji, Duluth, GA (US)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 15/002,738

(22) Filed: Jan. 21, 2016

(65) Prior Publication Data
US 2017/0211664 A1    Jul. 27, 2017

(51) Int. Cl.
| | |
|---|---|
| *F16H 7/08* | (2006.01) |
| *B60K 17/02* | (2006.01) |
| *A01D 34/82* | (2006.01) |
| *A01D 101/00* | (2006.01) |

(52) U.S. Cl.
CPC .......... *F16H 7/0827* (2013.01); *B60K 17/02* (2013.01); *A01D 34/82* (2013.01); *A01D 2101/00* (2013.01)

(58) Field of Classification Search
CPC .......... F16H 7/0827; F16H 2007/0842; F16H 2007/088; B60K 17/02; A01D 34/82; A01D 2101/00; F16D 67/00; F16D 67/02; F16D 2500/1102
See application file for complete search history.

(56) References Cited

U.S. PATENT DOCUMENTS

| | | | | | |
|---|---|---|---|---|---|
| 3,732,671 A | * | 5/1973 | Allen | ...................... | A01D 34/64 56/10.2 R |
| 3,766,722 A | * | 10/1973 | Kamlukin | .............. | A01D 34/64 56/11.6 |
| 4,285,419 A | * | 8/1981 | Anderson | .......... | A01D 34/6812 192/13 R |
| 4,301,902 A | * | 11/1981 | Gatsos | ................... | A01D 34/69 192/13 R |
| 4,408,683 A | | 10/1983 | Elmy | | |
| 4,721,494 A | * | 1/1988 | Hayashi | ............. | A01D 34/6806 192/13 A |
| 4,768,997 A | * | 9/1988 | Page | .................. | A01D 34/6806 474/27 |
| 4,934,989 A | * | 6/1990 | Furukawa | ............. | F16H 7/1281 474/135 |

(Continued)

FOREIGN PATENT DOCUMENTS

| | | |
|---|---|---|
| EP | 0 027 513 | 4/1981 |
| GB | 2 180 018 | 3/1987 |
| JP | H06-8741 | 1/1994 |

OTHER PUBLICATIONS

EPO Search Report dated Mar. 3, 2017 and issued in EP 16198186.5.

*Primary Examiner* — Laura Freedman
(74) *Attorney, Agent, or Firm* — Greenblum & Bernstein, P.L.C.

(57) ABSTRACT

Work vehicle includes a traveling device. A speed changing device speed-changes a driving force of the engine and transmits the speed-changed force to the traveling device. A belt transmission mechanism transmits the driving force of the engine to the speed changing device. A belt tension clutch switches over the belt transmission mechanism between a transmitting state and a non-transmitting state. A brake operating tool effects a braking operation of the traveling device. A coupling mechanism activates the belt tension clutch.

13 Claims, 8 Drawing Sheets

(56) References Cited

U.S. PATENT DOCUMENTS

| | | | | |
|---|---|---|---|---|
| 6,131,380 A | * | 10/2000 | Browning | A01D 34/64 56/14.7 |
| 6,347,560 B1 | * | 2/2002 | Maezawa | G05G 1/30 74/473.16 |
| 8,297,386 B2 | * | 10/2012 | Osuga | A01D 69/002 180/53.6 |
| 8,522,912 B2 | * | 9/2013 | Yamada | A01D 69/10 180/325 |
| 9,326,446 B2 | * | 5/2016 | Cmich | A01D 69/08 |

* cited by examiner

WORK VEHICLE

TECHNICAL FIELD

The disclosure relates to a work vehicle configured such that a driving force of an engine is speed-changed by a speed changer device and then transmitted to a traveling device.

RELATED ART

An example of a work vehicle configured as above is known from Patent Document 1. With the work vehicle disclosed in Patent Document 1, when an engine is to be started, a stepping-on operation on an HST pedal is inhibited when a brake operating tool ("a brake pedal" in the document) for braking the traveling device is stepped on so that the HST pedal for speed changing operation of a speed changing device ("an HST" in the document) may be forcibly locked to its neutral position.

RELATED ART DOCUMENT

Patent Document 1

Patent Document 1: Japanese Unexamined Patent Application Publication No. Hei. 6-8741

SUMMARY OF THE INVENTION

Problem to be Solved by Invention

In the case of the work vehicle disclosed in Patent Document 1 above, for realization of the forcible locking of the HST pedal to the neutral position, enhancement of parts strength is required for inhibiting the stepping-on operation on the HST pedal, thus tending to invite enlargement and cost increase of the arrangement.

In view of the above-described state of the art, there is a need for a work vehicle capable of inhibiting force transmission to the traveling device in a reliable manner when a brake operating tool is operated for braking, while effectively avoiding enlargement and cost increase of the arrangement.

Solution

According to a characterizing feature of the present invention,
a work vehicle comprises:
a traveling device;
an engine acting as a drive source for the traveling device;
a speed changing device that speed-changes a driving force of the engine and transmitting the speed-changed force to the traveling device;
a belt transmission mechanism that transmits the driving force of the engine to the speed changing device;
a belt tension clutch that switches over the belt transmission mechanism between a transmitting state for transmitting the driving force to the speed changing device and a non-transmitting state that blocks transmission of the driving force to the speed changing device;
a brake operating tool for effecting a braking operation of the traveling device; and
a coupling mechanism that activates the belt tension clutch for switching over the belt transmission mechanism into the non-transmitting state, in operative association with a braking operation on the brake operating tool.

With the above-described characterizing feature, when the brake operating tool is operated for braking, the brake operating tool and the belt transmission clutch are operably associated with each other via the coupling mechanism so that the belt transmission mechanism is switched into the non-transmitting state by the belt tension clutch.

Thus, in the event of a braking operation of the brake operating tool, for realization of the forcible locking of the HST pedal to its neutral position, there is no need for enhancement of parts strength as compared with the arrangement of inhibiting a stepping-on operation on the HST pedal. With this, it is possible to reliably block transmission of force to the traveling device when the brake operating tool is operated for braking, while avoiding enlargement and cost increase of the arrangement.

Further, in the present invention, preferably;
the brake operating tool is pivotable about a pivot axis that extends along a vehicle body left-right direction;
the belt tension clutch includes a tension arm pivotable about a pivot axis that extends in a vertical direction; and
the coupling mechanism is provided between the brake operating tool and the tension arm and configured to convert a pivotal direction of the brake operating tool into a pivotal direction of the tension arm.

Further, in the present invention, preferably;
the coupling mechanism includes a vertical arm connected to the brake operating tool and pivotable together with the brake operating tool, a lateral arm connected to the tension arm and pivotable together with the tension arm, and a link that links the vertical arm with the lateral arm.

Further, in the present invention, preferably;
the belt transmission mechanism includes an output pulley mounted on an output shaft of the engine, an input pulley mounted on an input shaft of the speed changing device, an idle pulley, and a transmission belt that is entrained around the output pulley, the input pulley and the idle pulley; and
the pivot axis of the tension arm is set coaxial with a rotational axis of the idle pulley.

EMBODIMENT OF THE INVENTION

Next, an embodiment of the present invention will be explained based on the accompanying drawings. Incidentally, in the following explanation, a direction denoted with an arrow F in FIG. 1 and FIG. 2 represents a "vehicle body front side", a direction denoted with an arrow B in FIG. 1 and FIG. 2 represents a "vehicle body rear side", and a direction denoted with an arrow L in FIG. 2 represents a "vehicle body left side", and a direction denoted with an arrow R in FIG. 2 represents a "vehicle body right side", respectively.

[General Arrangement of Grass Mower]

Figure 1:
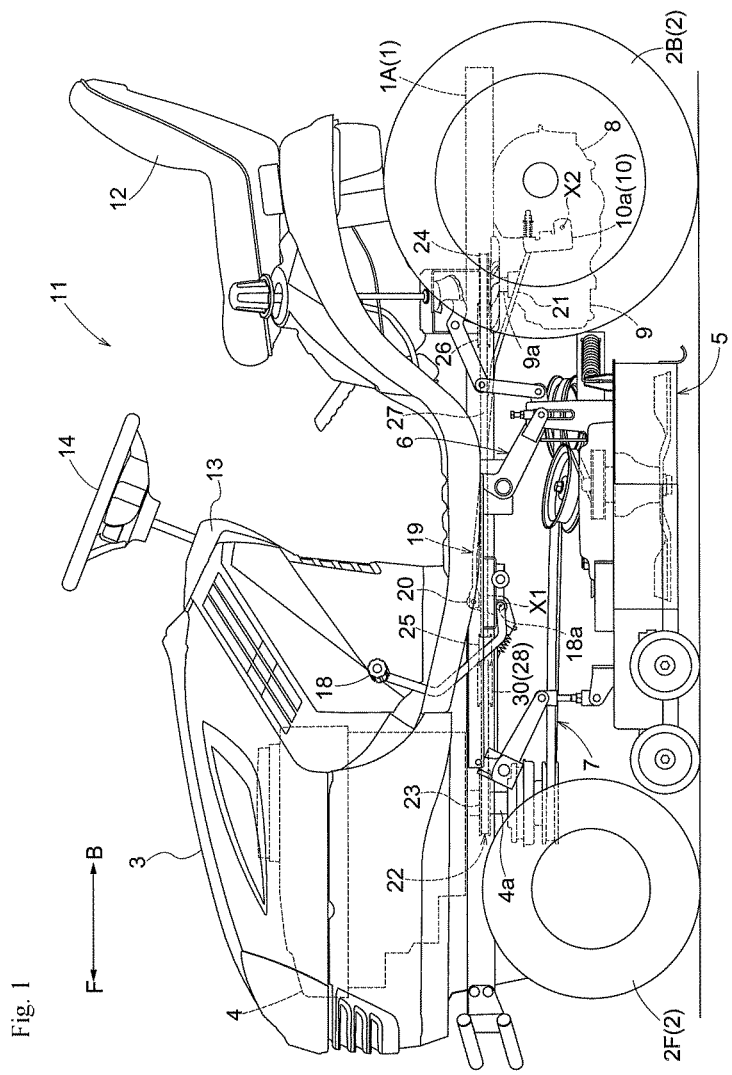
FIG. 1 is a left side view showing a grass mower.
Figure 2:
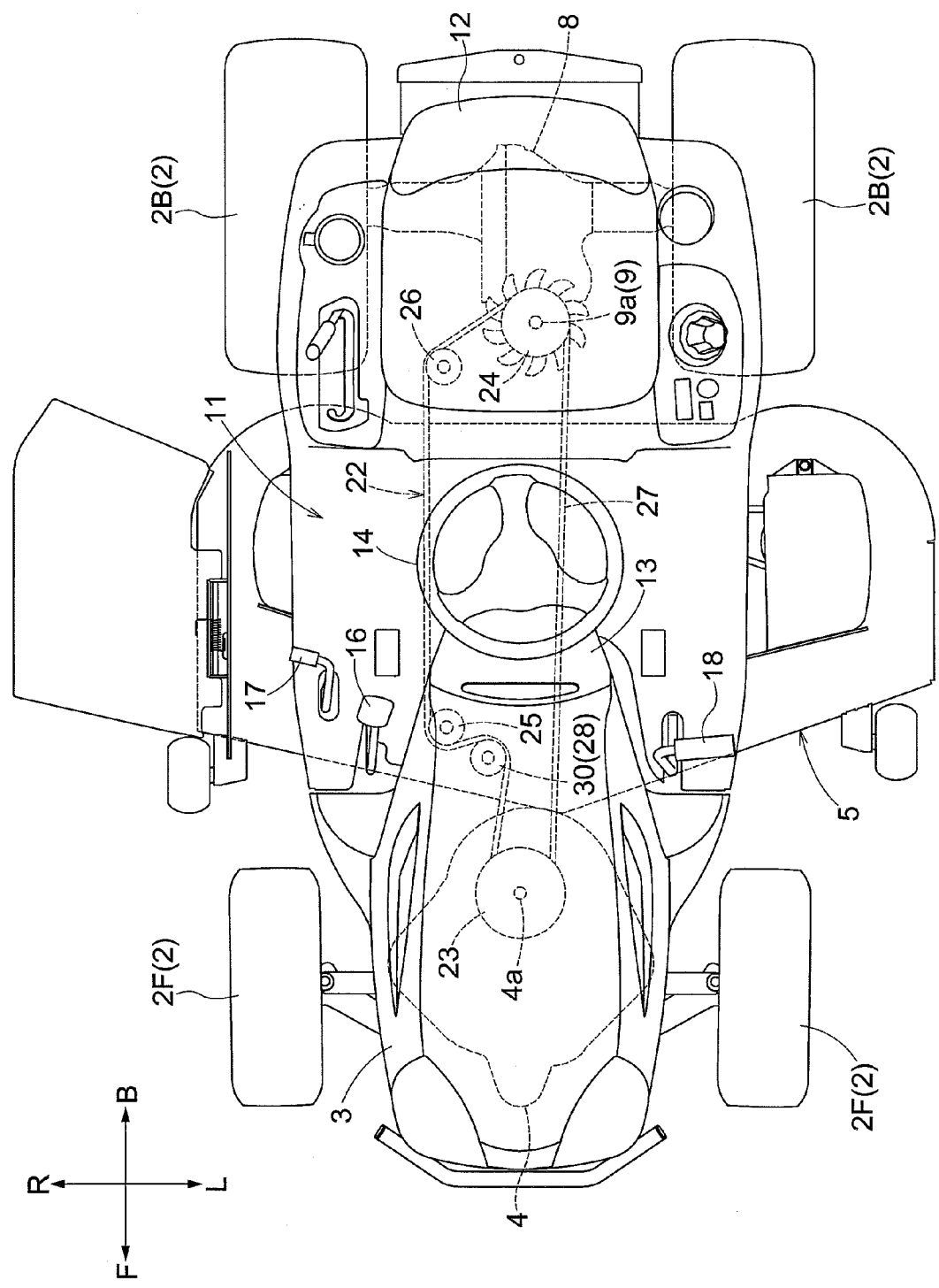
FIG. 2 is a plane view showing the grass mower.

FIG. 1 and FIG. 2 show a grass mower (a mid-mount type grass mower) corresponding to a "work vehicle" to which the present invention relates. This grass mower includes a vehicle body frame 1, and a wheel-type traveling device 2 that supports the vehicle body frame 1. The vehicle body frame 1 includes a pair of left and right main frames 1A that extend in the vehicle body front-rear direction. The traveling device 2 includes a pair of left and right steerable front wheels 2F and a pair of left and right drivable rear wheels 2B.

At a front half portion of the vehicle body frame 1, a hood 3 is mounted. Inside this hood 3, there is accommodated an engine 4 acting as a driving source for the traveling device 2, etc. From the engine 4, an engine output shaft 4a (corresponding to "an output shaft" relating to the present invention) protrudes downwards.

Between the front wheels 2F and the rear wheels 2B, a mower unit 5 is provided. This mower unit 5 is supported in a suspended manner to the vehicle body frame 1 via a lift mechanism 6 so that the mower unit 5 can be lifted up/down. Between the engine 4 and the mower unit 5, there is provided a mower belt transmission mechanism 7 configured to transmit a driving force of the engine 4 to the mower unit 5.

Between the pair of left and right rear wheels 2B, there is provided a transmission 8 that speed-changes the driving force of the engine 4 and transmits the resultant speed-changed force to the pair of left and right rear wheels 2B. This transmission 8 incorporates therein a brake device 10 that applies a braking force to a hydrostatic stepless speed changing device 9 and the pair of left and right rear wheels 2B.

From the stepless speed changing device 9, a speed changing input shaft 9a (corresponding to "an input shaft" relating to the present invention) protrudes upwards.

At a rear half portion of the vehicle body frame 1, a driving section 11 is provided. This driving section 11 includes a driver's seat 12 and a front panel 13. This front panel 13 includes a steering wheel 14 and a brake locking lever 15 (see FIG. 3) which will be described in details later herein. Adjacent a right foot of a driver seated at the driver's seat 12, there are provided side by side a forward speed setting pedal 16 and a rear speed setting pedal 17.

Adjacent a left foot of the driver seated at the driver's seat 12, there is provided a brake pedal 18 (corresponding to "a brake operating tool" relating to the present invention) for effecting a braking operation on the traveling device 2. This brake pedal 18 is pivotable about a pivot axis X1 which extends in the vehicle body left-right direction. The brake pedal 18 includes a pedal support shaft 18a that extends along the pivot axis X1.

The brake device 10 includes a brake arm 10a which is pivotable about a pivot axis X2 extending in the vehicle body left-right direction. Between the brake pedal 18 and the brake device 10, a coupling mechanism 19 is provided for operably coupling the brake pedal 18 with the brake device 10. The coupling mechanism 19 includes a pedal arm 20 mounted on the pedal support shaft 18a and a coupling rod 21 for operably coupling the pedal arm 20 with the brake arm 10a. When the brake pedal 18 is stepped on, the brake arm 10a is pivoted about the pivot axis X2 via the coupling mechanism 19, so that the brake device 10 provides a braking force.

Between the engine 4 and the stepless speed changing device 9, there is provided a traveling belt transmission mechanism 22 (corresponding to "a belt transmission mechanism" relating to the present invention) configured to transmit the driving force of the engine 4 to the stepless speed changing device 9. This traveling belt transmission device 22 includes an output pulley 23 mounted on the engine output shaft 4a, an input pulley 24 mounted on the speed changing input shaft 9a, a front idle pulley 25 (corresponding to "an idle pulley" relating to the present invention), a rear idle pulley 26, and a transmission belt 27 entrained around the output pulley 23, the input pulley 24, the front idle pulley 25 and the rear idle pulley 26.

[Belt Tension Clutch]

Figure 3:
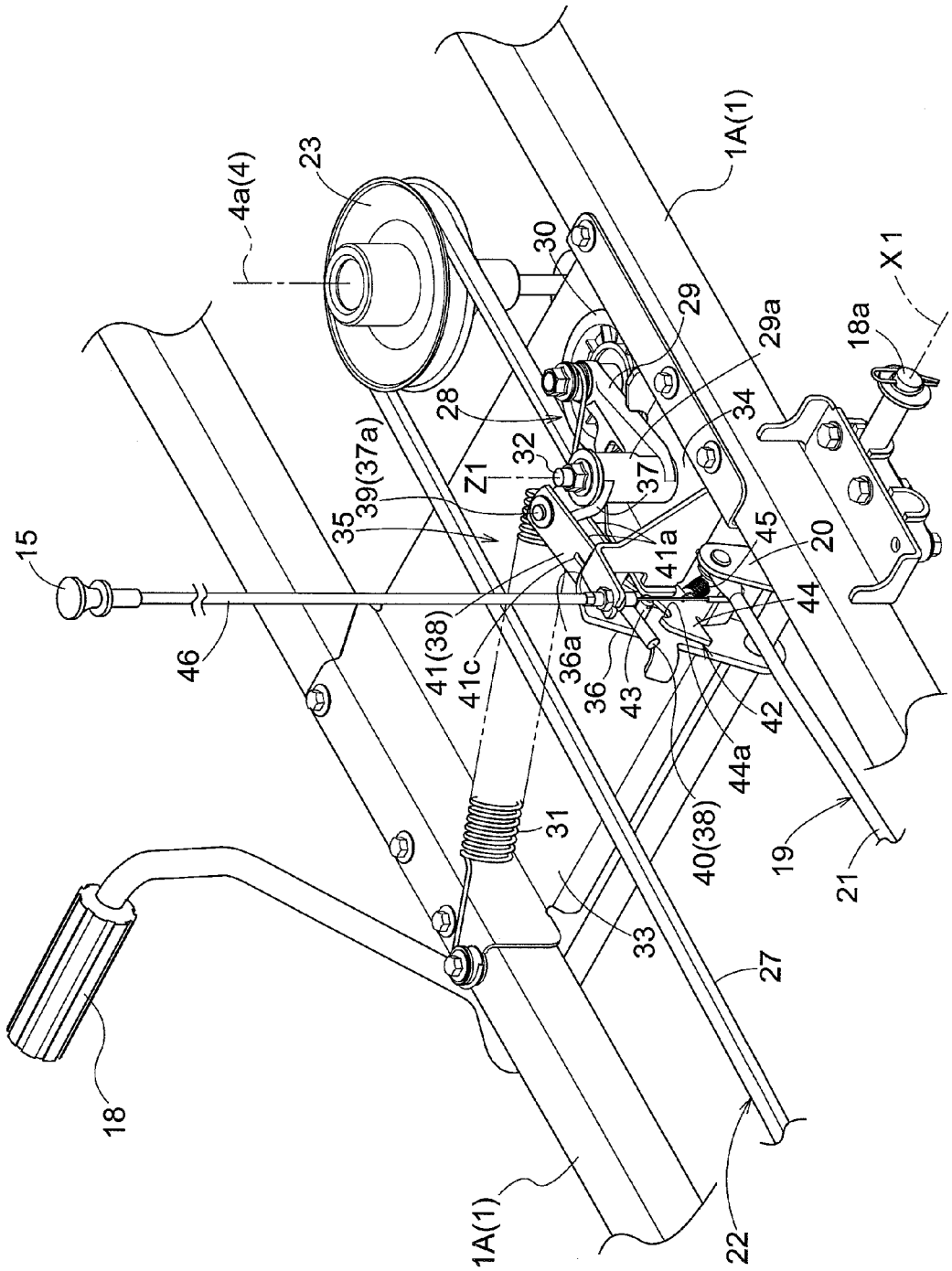
FIG. 3 is a perspective view showing a coupling mechanism.
Figure 4:
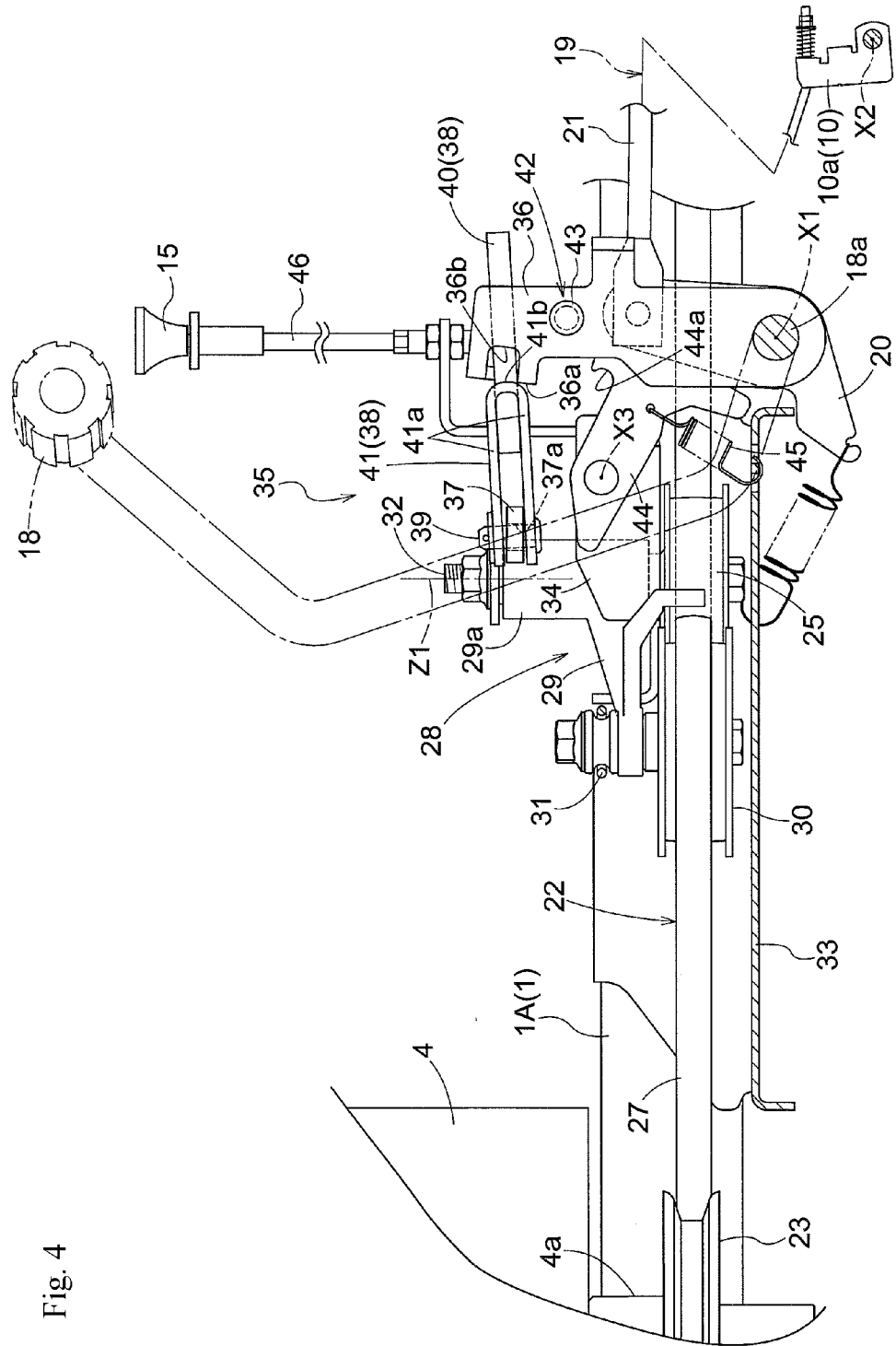
FIG. 4 is a left side view showing the coupling mechanism under a state when a brake pedal is not stepped on,
FIG. 5 is a plane view showing the coupling mechanism under the state when the brake pedal is not stepped on,
FIG. 6 is a left side view showing the coupling mechanism under a state when the brake pedal is stepped on,
FIG. 7 is a plane view showing the coupling mechanism under the state when the brake pedal is stepped on, and
FIG. 8 is a left side view showing a state when the brake pedal is retained at a stepped-on position.
Figure 5:
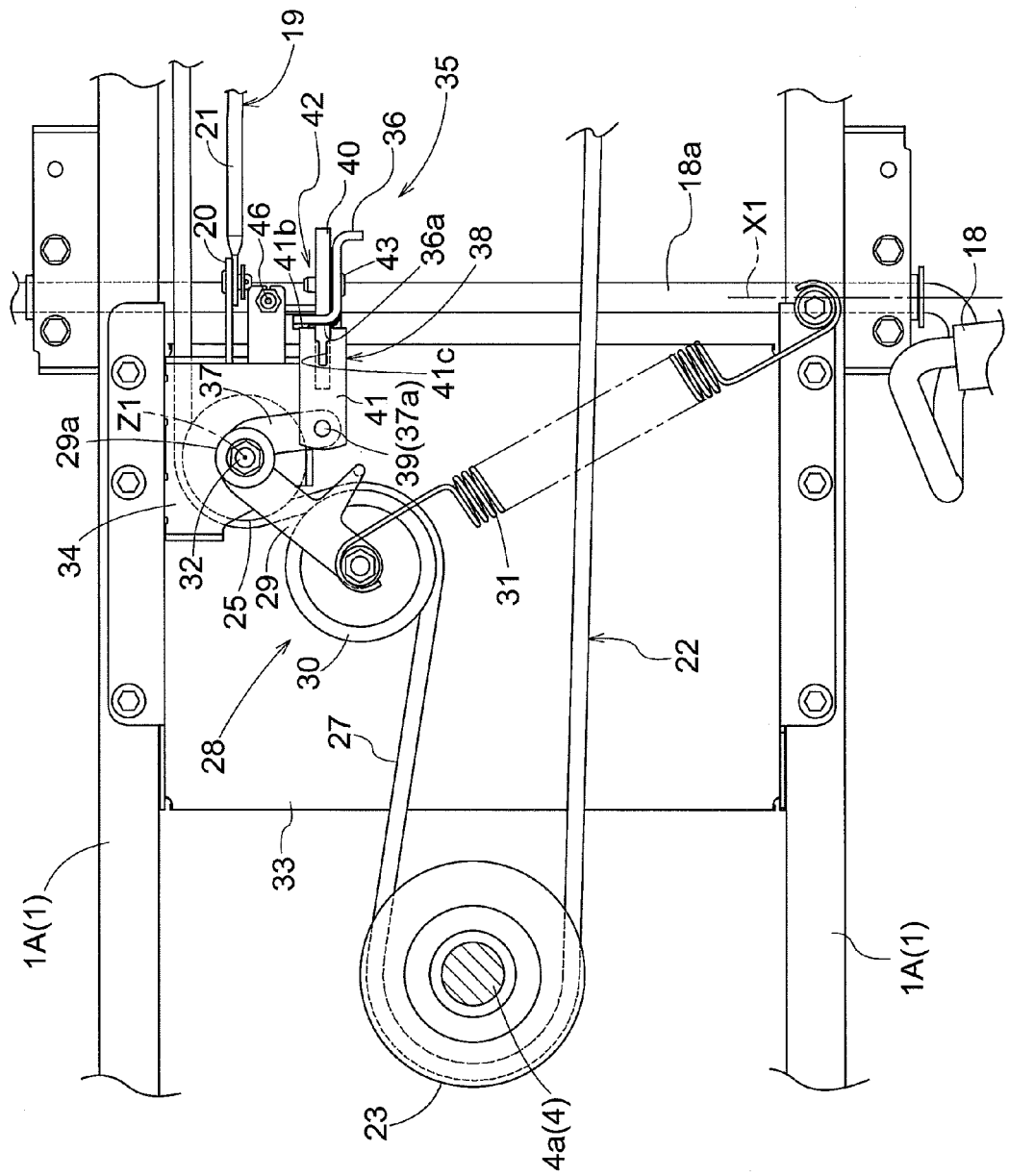

As shown in FIGS. 3 through FIG. 5, a belt tension clutch 28 is provided for switching over the traveling belt transmission mechanism 22 between a transmitting state for transmitting the driving force to the stepless speed changing device 9 and a non-transmitting state for blocking transmission of the driving force to the stepless speed changing device 9. The belt tension clutch 28 includes a tension arm 29 that is pivotable about a pivot axis Z1 extending in the vertical direction, a tension pulley 30 attached to a free end portion of the tension arm 29, and a tension spring 31 for urging the tension arm 29 in a tension applying direction. The tension pulley 30 is placed in contact, from the outer circumferential side of the transmission belt 27, with a portion of the transmission belt 27 which portion is located between the output pulley 23 and the front idle pulley 25. The tension arm 29 is pivotally supported to a support shaft 32 that extends along the pivot axis Z1. The pivot axis Z1 of the tension arm 29 is set coaxial with the rotational axis of the front idle pulley 25.

The belt tension clutch 28 is supported to a deck 33. This deck 33 is provided between the pair of left and right main frames 1A. The tension spring 31 is provided between the left end portion of the deck 33 and the tension arm 29. A support table 34 is supported in a cantilever manner to a right side wall of the deck 33. The support table 34 extends to the left side from a right end portion of the deck 33. The support shaft 32 is supported to the support table 34. The support shaft 32 extends vertically through the support table 34. The front idle pulley 25 is supported to a portion of the support shaft 32 which portion protrudes downwards from the support table 34.

[Coupling Mechanism]

A coupling mechanism 35 is provided for activating the belt tension clutch 28 so that the traveling belt transmission mechanism 22 may be switched over to the non-transmitting state in operative association with a braking operation of the brake pedal 18. This coupling mechanism 35 is provided between the brake pedal 18 and the tension arm 29 and configured to convert a pivotal direction of the brake pedal 18 about the pivot axis X1 into a pivotal direction of the tension arm 29 about the pivot axis Z1. The coupling mechanism 35 includes a vertical arm 36 connected to the pedal support shaft 18a and pivotable together with the brake pedal 18, a lateral arm 37 connected to the tension arm 29 and pivotable together with the tension arm 29, and a link 38 that links the vertical arm 36 with the lateral arm 37.

The lateral arm 37 is connected to a boss portion 29a of the tension arm 29 attached to the support shaft 32. To a free end portion of the lateral arm 37, the link 38 is pivotally connected via a connecting pin 39. To this end, at the free end portion of the lateral arm 37, there is formed an insertion hole 37a into which the connecting pin 39 is to be inserted. The hole diameter of the insertion hole 37a is set to be slightly larger than the outer diameter of the connecting pin 39 so as to allow a certain amount of looseness of the connecting pin 39 therein.

The link 38 is provided between the vertical arm 36 and the lateral arm 37. This link 38 includes a rod 40 and a connecting bracket 41. The rod 40 protrudes from the connecting bracket 41 towards the vertical arm 36 side and this rod 40 is formed of a round bar.

The connecting bracket 41 pivotally connected to the free end portion of the lateral arm 37 via the connecting pin 39, with the bracket 41 clamping the lateral arm 37 from the upper and lower sides thereof. The connecting bracket 41 includes a pair of clamping portions 41a for clamping the lateral arm 37 from the upper and lower sides thereof, a bent portion 41b extending between the pair of clamping portions 41a, and an attaching groove 41c in which the rod 40 is to be attached. The distance between the pair of clamping portions 41a is set to be slightly larger than the thickness of the free end portion of the lateral arm 37. A face of the bent portion 41b on the side of the vertical arm 36 is formed with some roundness (arcuate shape).

At the free end portion of the vertical arm 36, there is formed a contact portion 36a to which the bent portion 41b of the connecting bracket 41 comes into contact. At this contact portion 36a, there is formed a laterally elongate insertion hole 36b in which the rod 40 is to be inserted. The size of the insertion hole 36b is set slightly larger than the outer diameter of the rod 40 so as to allow a certain amount of looseness of the rod 40 therein.

[Locking Mechanism]

There is provided a locking mechanism 42 capable of retaining the brake pedal 18 at its stepped-on position. This locking mechanism 42 includes a lock pin 43 attached to the vertical arm 36, a lock arm 44 engageable with the lock pin 43, and a lock spring 45. The lock pin 43 protrudes from the vertical arm 36 along the vehicle body left-right direction (e.g. to the right side from the vertical arm 36 in this embodiment). The lock arm 44 is pivotable about a pivot axis X3 extending in the vehicle body left-right direction between an engaging position for its engagement with the lock pin 43 and a non-engaging position for its non-engagement with the lock pin 43. The lock arm 44 is supported to the support table 34 (e.g. to the left side wall of the support table 34 in this embodiment). The lock spring 45 urges the lock arm 44 for pivoting this lock arm 44 about the pivot axis X3 towards its non-engaging position.

Between the brake locking lever 15 and the lock arm 44, there is provided a coupling mechanism 46 (e.g. a cable wire) for operably coupling the brake locking lever 15 with the lock arm 44. An end of the coupling mechanism 46 on the lock arm 44 side thereof is supported to the support table 34.

[Operable Coupling between Braking Operation of Brake Pedal and Belt Tension Clutch]

As shown in FIG. 4 and FIG. 5, when the brake pedal 18 is not stepped on, the tension arm 29 is pivoted in the tension applying direction by the tension spring 31, so that the tension pulley 30 applies a tension to the transmission belt 27. With this, the traveling belt transmission mechanism 22 is switched to the transmitting state.

Figure 6:
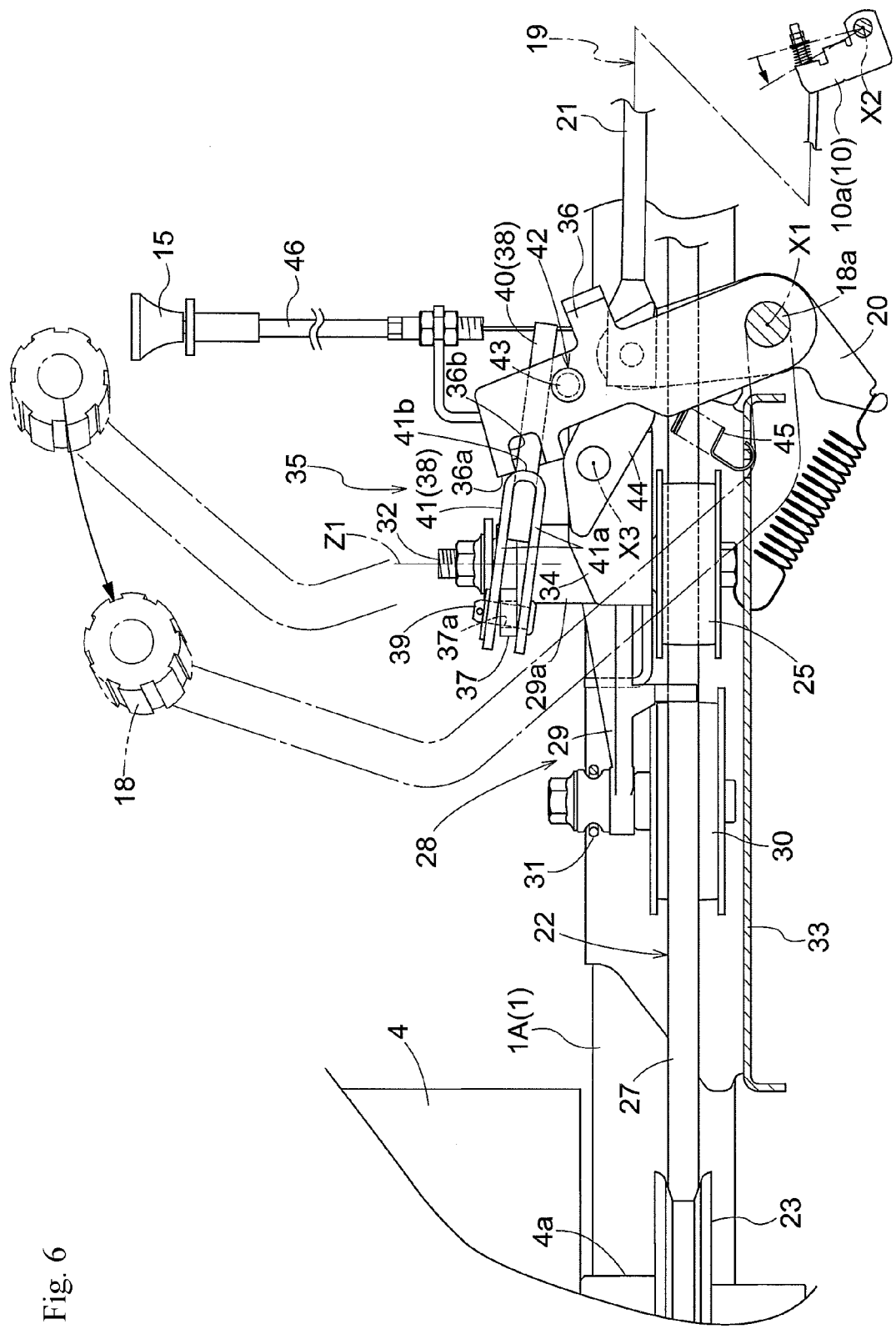
Figure 7:
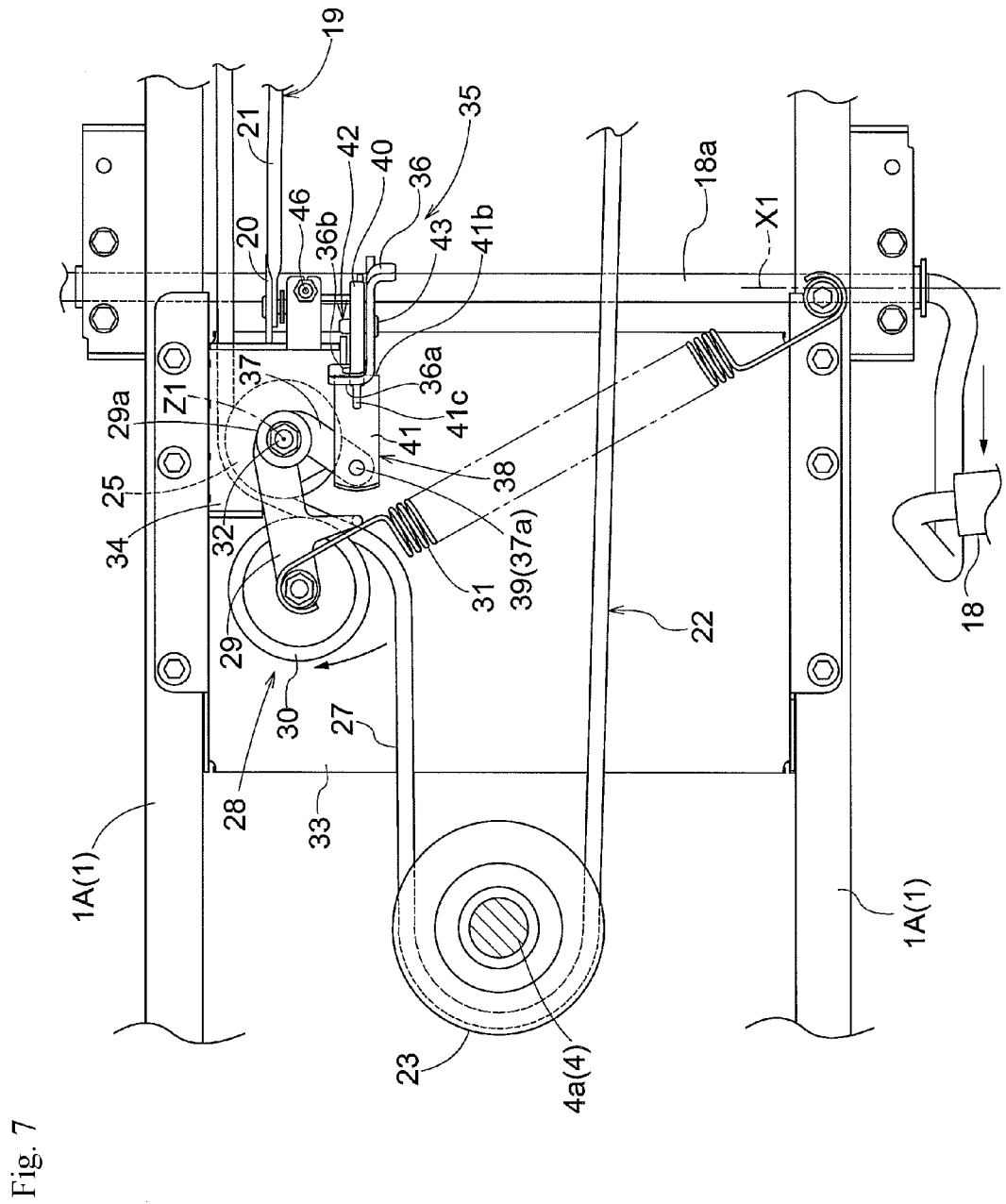

Then, when the brake pedal 18 is stepped on, as shown in FIG. 6 and FIG. 7, the vertical arm 36 is pivoted forwardly about the pivot axis X1 together with the pedal support shaft 18a. Thus, the contact portion 36a of the vertical arm 36 comes into contact with the bent portion 41b of the connecting bracket 41, whereby the link 38 is pushed in forwardly by the vertical arm 36.

In the course of the above, the posture of the link 38 gradually changes from a rearwardly upwardly slanted state (see FIG. 4) to a rearwardly downwardly slanted state (see FIG. 6). Also, as described above, as the face of the bent portion 41b on the vertical arm 36 side is formed with some roundness (actuate shape), a smooth movement is realized without e.g. hooking phenomenon occurring between the contact portion 36a and the bent portion 41b.

With the above, the tension arm 29 and the lateral arm 37 are pivoted to the side opposite the tension applying direction about the pivot axis Z1 against the urging force of the tension spring 31. Namely, the pivotal direction of the brake pedal 18 about the pivot axis X1 is converted into the pivotal direction of the tension arm 29 about the pivot axis Z1. In this way, tension application to the transmission belt 27 by the tension pulley 30 is released, whereby the traveling belt transmission mechanism 22 is switched over to the non-transmitting state.

Figure 8:
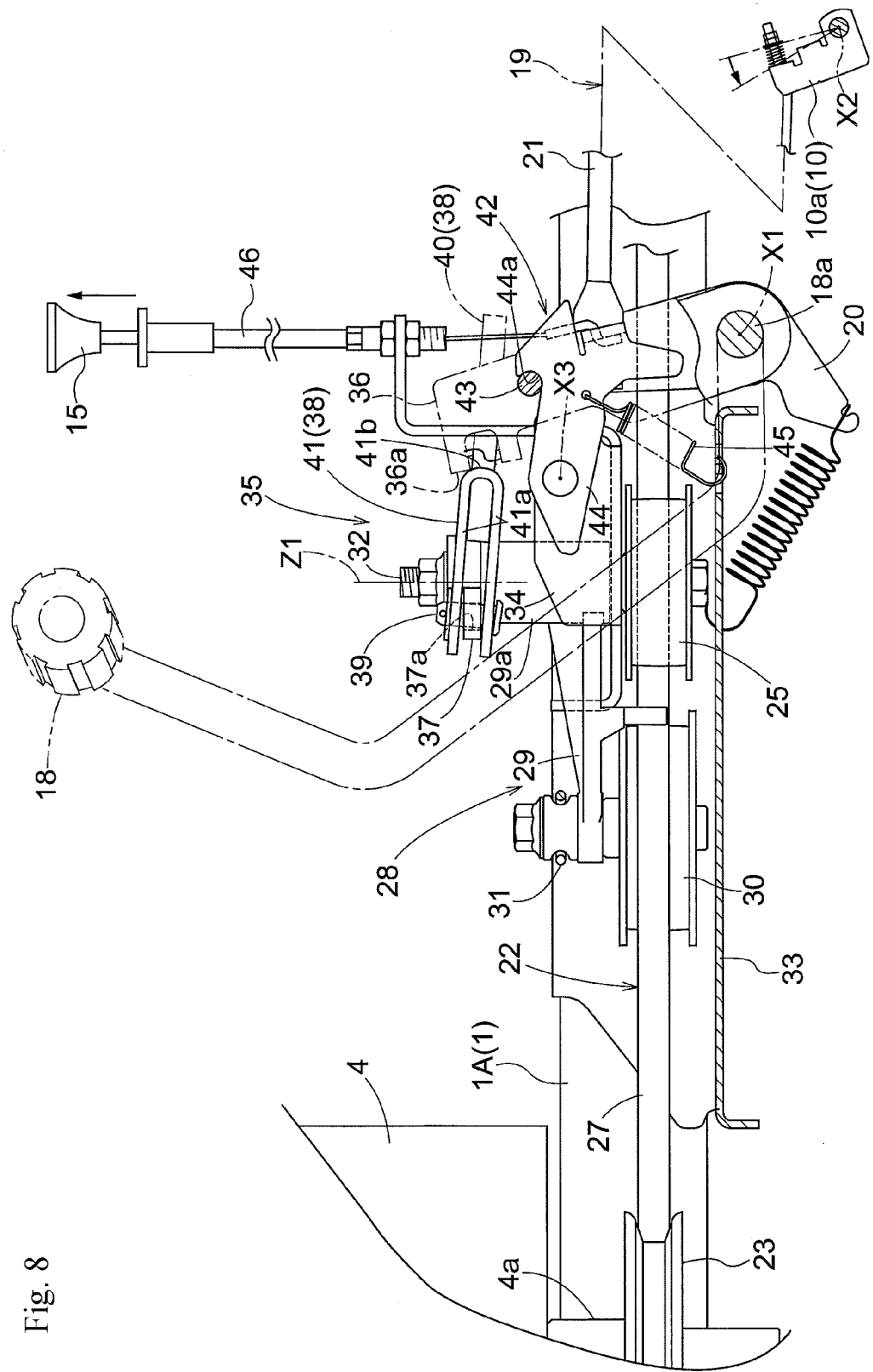

Then, as shown in FIG. 8, under a state of the brake pedal 18 being stepped on to its stepped-on position, if the coupling mechanism 46 is pulled by the brake locking lever 15, the lock arm 44 is pivoted toward its engaging position about the pivot axis X3 against the urging force of the lock spring 44, and an engaging recess 44a of the lock arm 44 is engaged with the lock pin 43. With this, the brake pedal 18 is retained at its stepped-on position by the locking mechanism 42. In this way, as the brake pedal 18 is retained at its stepped-on position, the brake device 10 can be used as a parking brake.

According to the above-described arrangement, in operative association with a braking operation of the brake pedal 18, the brake pedal 18 and the belt tension clutch 28 are operably associated with each other via the coupling mechanism 35 so that the traveling belt transmission mechanism 22 is switched over to the non-transmitting state by the belt tension clutch 28. Therefore, there is no need for enhancement of parts strength for realization of forcible locking of the forward speed setting pedal 16 and the rear speed setting pedal 17, as compared with the arrangement of inhibiting a stepping-on operation on the forward speed setting pedal 16 and the rear speed setting pedal 17. With this, it is possible to reliably block transmission of force to the traveling device 2 when the brake pedal 18 is operated for braking, while avoiding enlargement and cost increase of the arrangement.

[Other Embodiments]

(1) In the foregoing embodiment, the "brake operating tool" relating to the present invention is constituted of the brake pedal 18. Instead, this tool can be constituted of a brake lever.

(2) In the foregoing embodiment, the traveling belt transmission mechanism 22 transmits driving force of the engine 4 to the stepless speed changing device 9. Instead, the driving force of the engine 4 can be transmitted to a gear speed changing device.

(3) In the foregoing embodiment, between the vertical arm 36 and the lateral arm 37, there is provided the link 38 that operatively links the vertical arm 36 with the lateral arm 37. Instead of this, between the vertical arm 36 and the tension arm 29, there can be provided a link for operably linking the vertical arm 36 with the tension arm 29. In this case, the lateral arm 37 will become unnecessary.

(4) In the foregoing embodiment, the pivot axis Z1 of the tension arm 29 is set coaxial with the rotational axis of the front idle pulley 25. Instead, the pivot axis Z1 can be set coaxial with an axis different from the rotational axis of the front idle pulley 25.

INDUSTRIAL APPLICABILITY

The present invention is applicable not only to a grass mower, but also to e.g. a utility vehicle, a tractor, a rice planter, a combine, etc. Further, this invention is applicable not only to an agricultural work vehicle, but also to a civil engineering work vehicle.

DESCRIPTION OF REFERENCE MARKS/NUMERALS

2: traveling device
4: engine
4a: engine output shaft (output shaft)
9: stepless speed changing device (speed changing device)
9a: speed changing input shaft (input shaft)
18: brake pedal (brake operating tool)
22: traveling belt transmission mechanism (belt transmission mechanism)
23: output pulley
24: input pulley
25: front idle pulley (idle pulley)
27: transmission belt
28: belt tension clutch
29: tension arm
35: coupling mechanism
36: vertical arm
37: lateral arm
38: link
X1: pivot axis
Z1: pivot axis

The invention claimed is:

1. A work vehicle comprising:
a traveling device;
an engine acting as a drive source for the traveling device;
a speed changing device that speed-changes a driving force of the engine and transmitting the speed-changed force to the traveling device;
a belt transmission mechanism that transmits the driving force of the engine to the speed changing device;
a belt tension clutch that switches over the belt transmission mechanism between a transmitting state for transmitting the driving force to the speed changing device and a non-transmitting state that blocks transmission of the driving force to the speed changing device;
a brake operating tool for effecting a braking operation of the traveling device;
a coupling mechanism that activates the belt tension clutch for switching over the belt transmission mechanism into the non-transmitting state, in operative association with a braking operation on the brake operating tool; and
at least one foot-operated speed setting mechanism that is not coupled to the brake operating tool.

2. The work vehicle according to claim 1, wherein:
the brake operating tool is pivotable about a pivot axis that extends along a vehicle body left-right direction;
the belt tension clutch includes a tension arm pivotable about a pivot axis that extends in a vertical direction; and
the coupling mechanism is provided between the brake operating tool and the tension arm and configured to convert a pivotal direction of the brake operating tool into a pivotal direction of the tension arm.

3. The work vehicle according to claim 2, wherein the coupling mechanism includes a vertical arm connected to the brake operating tool and pivotable together with the brake operating tool, a lateral arm connected to the tension arm and pivotable together with the tension arm, and a link that links the vertical arm with the lateral arm.

4. The work vehicle according to claim 2, wherein:
the belt transmission mechanism includes an output pulley mounted on an output shaft of the engine, an input pulley mounted on an input shaft of the speed changing device, an idle pulley, and a transmission belt that is entrained around the output pulley, the input pulley and the idle pulley; and
the pivot axis of the tension arm is set coaxial with a rotational axis of the idle pulley.

5. The work vehicle according to claim 1, wherein the at least one speed setting mechanism is arranged on an opposite side of the work vehicle from the brake operating tool.

6. A work vehicle comprising:
a traveling device;
an engine acting as a drive source for the traveling device;
a speed changing device that speed-changes a driving force of the engine and transmitting the speed-changed, force to the traveling device;
a belt transmission mechanism that transmits the driving force of the engine to the speed changing device;
a belt tension clutch that switches over the belt transmission mechanism between a transmitting state for transmitting the driving force to the speed changing device and a non-transmitting state that blocks transmission of the driving force to the speed changing device;
a brake operating tool for effecting a braking operation of the traveling device;
a coupling mechanism that activates the belt tension clutch for switching over the belt transmission mechanism into the non-transmitting state, in operative association with a braking operation on the brake operating tool; and
at least one speed setting mechanism that is not coupled to the brake operating tool and that comprises a pedal.

7. The work vehicle according to claim 6, wherein the pedal comprises one of:
a forward speed setting pedal; and
a rear speed setting pedal.

8. A work vehicle comprising:
a vehicle body;
an engine;
a transmission;
a belt transmission mechanism that transmits drive force of the engine to the transmission;
a belt tension clutch that switches over the belt transmission mechanism between a transmitting state for transmitting the drive force and a non-transmitting state that blocks transmission of the drive force;
a brake for effecting a braking operation of the vehicle body;
a coupling mechanism that activates the belt tension clutch for switching over the belt transmission mechanism into the non-transmitting state, said coupling mechanism being in operative association with a braking operation on the brake; and
at least one speed setting pedal that is not coupled to the brake.

9. The work vehicle according to claim 8, wherein the at least one speed setting pedal is arranged on an opposite side of the work vehicle from the brake.

10. The work vehicle according to claim 8, wherein the at least one speed setting pedal comprises a forward speed setting pedal and a rear speed setting pedal.

11. A work vehicle comprising:
a vehicle body with wheels;
a suspended mower unit;
an engine;
a transmission;
a belt transmission mechanism that transmits drive force of the engine to the transmission;
a belt tension clutch that switches over the belt transmission mechanism between a transmitting state for transmitting the drive force and a non-transmitting state that blocks transmission of the drive force;
a brake for effecting a braking operation of the vehicle body;
a coupling mechanism that activates the belt tension clutch for switching over the belt transmission mechanism into the non-transmitting state, said coupling mechanism being in operative association with a braking operation on the brake; and
a speed setting pedal that is not coupled to the brake.

12. The work vehicle according to claim 11, wherein the setting pedal is arranged on an opposite side of the work vehicle from the brake.

13. The work vehicle according to claim 12, wherein the speed setting pedal is one of a forward speed setting pedal and a rear speed setting pedal.

* * * * *

UNITED STATES PATENT AND TRADEMARK OFFICE
CERTIFICATE OF CORRECTION

PATENT NO. : 9,915,324 B2
APPLICATION NO. : 15/002738
DATED : March 13, 2018
INVENTOR(S) : Y. Shoji Page 1 of 1

It is certified that error appears in the above-identified patent and that said Letters Patent is hereby corrected as shown below:

In the Claims

Column 8, Lines 21, 22 (Claim 6, Lines 5, 6) please change "speed-changed, force" to
-- speed-changed force --

Signed and Sealed this
Twenty-third Day of October, 2018

Andrei Iancu
*Director of the United States Patent and Trademark Office*